US006304059B1

United States Patent
Chalasani et al.

(10) Patent No.: US 6,304,059 B1
(45) Date of Patent: Oct. 16, 2001

(54) BATTERY MANAGEMENT SYSTEM, METHOD OF OPERATION THEREFOR AND BATTERY PLANT EMPLOYING THE SAME

(76) Inventors: Subhas C. Chalasani, 4417 Brigade Ct., Plano, TX (US) 75024; Roy J. Davis, 3713 Jennifer La., Rowlett, TX (US) 75088; Michael C. Steeves, 800 W. Renner Rd., Apt. 2726 Richardson, TX (US) 75080; Vijayan J. Thottuvelil, 3328 Russell Cir., Plano, TX (US) 75023

( * ) Notice: Subject to any disclaimer, the term of this patent is extended or adjusted under 35 U.S.C. 154(b) by 0 days.

(21) Appl. No.: 09/602,084

(22) Filed: Jun. 22, 2000

(51) Int. Cl.[7] ........................................ H02J 7/04
(52) U.S. Cl. ............................. 320/118; 320/119
(58) Field of Search ................... 320/118, 119, 320/120, 122; 323/267; 307/66, 71, 84, 85, 86, 87, 150; 361/18, 17, 54, 115; 363/65, 69

(56) References Cited

U.S. PATENT DOCUMENTS

| | | | |
|---|---|---|---|
| 5,025,202 | * 6/1991 | Ishii et al. | 320/101 |
| 5,394,075 | * 2/1995 | Ahrens et al. | 320/101 |
| 5,532,524 | * 7/1996 | Townsley et al. | 307/64 |
| 5,659,465 | * 8/1997 | Flack et al. | 363/71 |
| 5,701,068 | * 12/1997 | Baer et al. | 320/119 |
| 6,043,629 | * 3/2000 | Ashley et al. | 320/119 |
| 6,049,190 | * 4/2000 | Canter et al. | 320/101 |

* cited by examiner

Primary Examiner—Peter S. Wong
Assistant Examiner—Gregory J. Toatley, Jr.

(57) ABSTRACT

For use with a battery plant coupled to a source of electrical power and having a power bus coupled to a load, the battery plant including a battery string coupled across a pair of rails of said power bus, a battery management system, method of operation therefor and battery plant employing the same. In one embodiment, the battery management system includes a DC/DC converter, couplable in series with the battery string, adapted to condition a voltage provided to the battery string as a function of a characteristic of the battery string. The battery management system also includes a switching circuit, coupled across the DC/DC converter, adapted to selectively decouple the DC/DC converter from the battery string thereby allowing the battery string to power the load.

20 Claims, 2 Drawing Sheets

BATTERY MANAGEMENT SYSTEM, METHOD OF OPERATION THEREFOR AND BATTERY PLANT EMPLOYING THE SAME

TECHNICAL FIELD OF THE INVENTION

The present invention is directed, in general, to power plants and, more specifically, to a battery management system, method of operation therefor, and a battery plant employing the same.

BACKGROUND OF THE INVENTION

The traditional reliability of telecommunication systems that users have come to expect and rely upon is based, in part, on the reliance on redundant equipment and power supplies. Telecommunication switching systems, for example, route tens of thousands of calls per second. The failure of such systems, due to either equipment breakdown or loss of power, is unacceptable, since such failure may result in the discontinuation of millions of telephone calls and a corresponding loss of revenue.

Power plants, such as battery plants, address the power loss problem by providing the system with an energy reserve (e.g., a battery) in the event of the loss of primary power to the system. A battery plant generally operates as follows. The battery plant includes a number of batteries, rectifiers and other power distribution equipment. The primary power is produced by the rectifiers, which convert an AC main voltage into a DC voltage to power the load equipment and to charge the batteries. The primary power may, however, become unavailable due to an AC power outage or the failure of one or more of the rectifiers. In either case, the batteries then provide power to the load. Redundant rectifiers and batteries may be added to the battery plant as needed to increase the availability of the battery plant.

A battery plant that powers telecommunications systems, such as transmission and switching systems in wireless base stations, commonly employs valve-regulated lead-acid (VRLA) batteries as the energy reserve. The batteries are typically connected in strings (battery strings) and coupled directly to the output of the rectifiers to instantly provide power to the load in the event an AC power outage occurs. During normal operation, the batteries are usually maintained in a fully charged state to maximize a duration for which the batteries can provide energy to the load equipment. However, because all the battery strings in battery plants found in the prior art are charged simultaneously and for the same duration, the individual battery strings are typically not charged to their optimum potentials.

The batteries are typically float charged in multiple battery strings, with each battery string having multiple batteries or monoblocks. For example, four 12V monoblocks may be connected in series to form a 48V battery string. The battery strings are coupled across the output of the rectifiers and are charged by drawing current from the output bus of the rectifiers. As the batteries charge, the amount of current drawn from the rectifiers is reduced, until only a small float current, sufficient to keep the batteries fully charged, is drawn. A float voltage may be adjusted based on battery temperature. With multiple battery strings, however, the temperature of the battery strings may be different. However, since the voltage of the rectifiers' output bus is common to all the battery strings, the float voltage of an individual battery string cannot be set at an optimal level.

Furthermore, the prior art methods of determining the individual capacities of each battery remain crude and imprecise. Current battery plants test the capacity of all the battery strings as a whole. Specifically, to determine the charge capacity of a battery string, the controller adjusts the overall battery plant voltage to allow the batteries in the battery string to discharge at a constant and desired current level. During this process the voltage of the battery string may be monitored to assess its capacity.

A problem occurs when multiple battery strings are employed in a single battery plant. In this situation, while the controller can still adjust the battery plant voltage to provide battery discharge at a constant desired current level, it is necessary to assess the capacities of all the battery strings at the same time. A defective battery string may, therefore, not be detectable.

Accordingly, what is needed in the art is a battery management system, and related method, employable with a battery plant having at least one battery string and, in many instances, a plurality of battery strings, that can individually assess and improve the performance of each battery string in the battery plant.

SUMMARY OF THE INVENTION

To address the above-discussed deficiencies of the prior art, the present invention provides, for use with a battery plant coupled to a source of electrical power and having a power bus coupled to a load, the battery plant including a battery string coupled across a pair of rails of said power bus, a battery management system, method of operation therefor and battery plant employing the battery management system or the method. In one embodiment, the battery management system includes a DC/DC converter, couplable in series with the battery string, adapted to condition a voltage provided to the battery string as a function of a characteristic of the battery string. The battery management system also includes a switching circuit, coupled across the DC/DC converter, adapted to selectively decouple the DC/DC converter from the battery string thereby allowing the battery string to power the load.

The present invention, in one aspect, introduces a battery management system for a battery string located in a battery plant. The battery management system is designed to be series-coupled to the battery string and adapted to condition a voltage to the battery string as a function of a characteristic thereof. The charging of the battery string can be customized by taking into account various parameters, such as the environment (e.g., temperature), state of charge of the battery and electrical characteristics (e.g., a voltage) of the battery string. The battery management system, therefore, provides additional functionality to the battery plant such as charging control and state of health assessment of the battery string.

In one embodiment of the present invention, the battery plant further includes at least one AC/DC rectifier coupled to the source of electrical power. The AC/DC rectifier transforms AC power from the source of electrical power to a substantially equivalent DC component to power the battery plant and, ultimately, the load.

In one embodiment of the present invention, the DC/DC converter is a bi-directional DC/DC converter. Of course, other power converter topologies may be used in accordance with the requirements of a particular application.

In one embodiment of the present invention, the battery plant further includes a controller that monitors the characteristic of said battery string. The controller is adapted to monitor any condition of the battery string such as a voltage, state of charge or environmental conditions. The controller then employs that information to regulate the battery management system.

In one embodiment of the present invention, the battery plant further includes a plurality of battery strings coupled across the rails of the power bus. A battery plant often includes a plurality of battery strings to accommodate higher load requirements or for backup protection. The battery management system is especially useful in such applications to customize the treatment of each battery string when there are multiple battery strings. In a battery plant including multiple battery strings, it is preferable to include a plurality of DC/DC converters and switching circuits adapted to be coupled to corresponding battery strings.

In one embodiment of the present invention, the battery string includes a battery selected from the group consisting of: (1) a valve-regulated lead-acid (VRLA) battery; (2) a flooded lead-acid battery; (3) a nickel-cadmium battery; and (4) a lithium battery. Such batteries are often employed in battery plants to power telecommunications systems such as transmission and switching systems, and in wireless base stations as the energy reserve. Of course, any type of battery may be employed in conjunction with the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
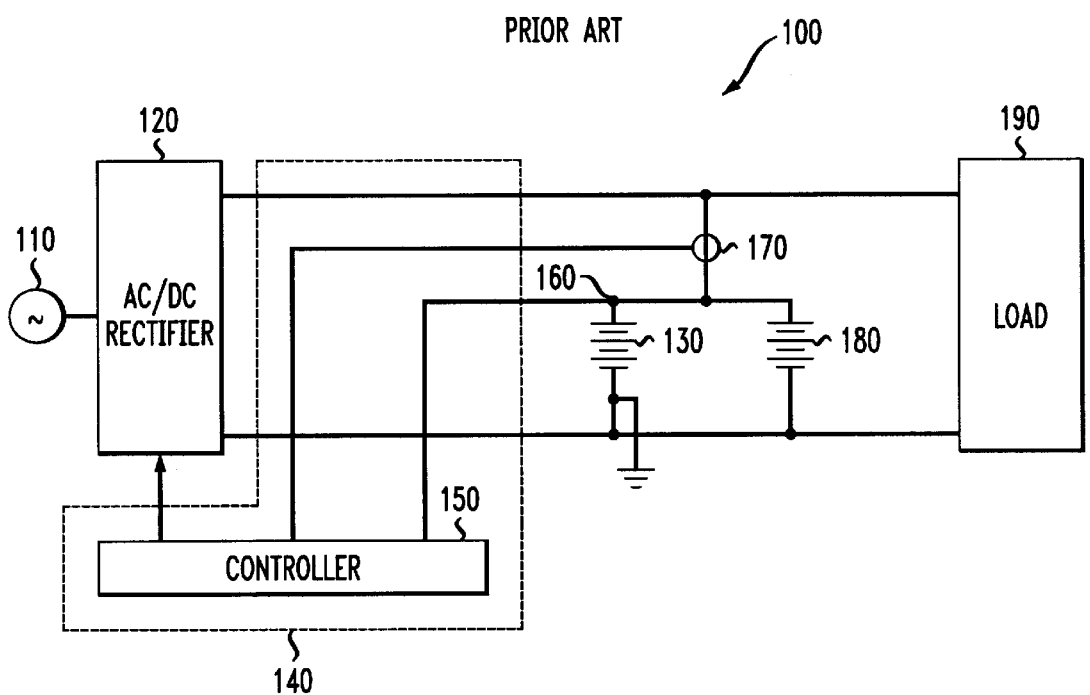
FIG. 1 illustrates a diagram of a prior art battery plant.

Referring initially to FIG. 1, illustrated is a diagram of a prior art battery plant 100. The battery plant 100 is coupled to a source of AC power 110 and provides DC power to a load 190. The battery plant 100 is employable to power variable loads (i.e., loads having variable current draw) such as wireless base station equipment. The current draw of the load 190 may vary, for example, as a function of an amount of voice traffic carried by the base station.

The battery plant 100 includes a rectifier 120 coupled to the source 110. Those skilled in the pertinent art realize, of course, that the battery plant 100 may include a number of parallel-coupled rectifiers 120, depending on the power requirements of the load 190. The battery plant 100 further includes first and second battery strings 130, 180 coupled to an output of the rectifier 120. Of course, additional batteries or battery strings (employable for backup or supplemental power requirements) may be added as necessary to increase the availability of the battery plant 100. The first and second battery strings 130, 180 may include VRLA batteries or any other type of battery, whether conventional or later-developed.

The battery plant 100 still further includes a system 140 for assessing the capacity of the first and second battery strings 130, 180. The system 140 includes a controller 150, coupled to the rectifier 120, that, during the assessment interval, controls an output current of the rectifier 120 to set a discharge current of the first and second battery strings 130, 180 at a substantially constant level. The controller 150 controls the output current of the rectifier 120 by adjusting an output voltage of the rectifier 120 relative to the voltage of the first and second battery strings 130, 180. The system 140 further includes a voltage sensor 160, coupled to the first and second battery strings 130, 180, that measures a voltage of the first and second battery strings 130, 180.

The capacity of the first and second battery strings 130, 180 and their charge level determines a duration for which the first I and second battery strings 130, 180 can provide energy. As the batteries forming the first and second battery strings 130, 180 age, however, their individual capacities decrease, reducing the duration for which the first and second battery strings 130, 180 can provide energy, even when fully charged. The system 140, therefore, detects when the actual capacities of the first and second battery strings 130, 180 have diminished beyond a threshold, such as 80% of their rated capacity. The first and second battery strings 130, 180 may then be considered to have failed and should be replaced to maintain the battery plant 100 at the desired level of availability. By treating the first and second battery strings 130, 180 as identical, the battery plant 100 may indicate that the first and second battery strings 130, 180 have failed when only one has actually failed. As a result, the full potential of first and second battery strings 130, 180 may not be achieved.

The system 140 operates as follows. The controller 150 employs a current sensor 170 to sense the discharge current of the first and second battery strings 130, 180. Alternatively, the controller 150 can sense both the output current of the rectifier 120 and a current draw of the load 190 and derive therefrom the discharge current of the first and second battery strings 130, 180. Even when using this method, the first and second battery strings 130, 180 are treated as identical and the actual characteristics of each individual battery of the first and second battery strings 130, 180 are not determined.

The controller 150 is coupled to the rectifier 120. The controller 150 adjusts a reference voltage of the rectifier 120 to increase or decrease the output voltage of the rectifier 120 relative to the voltage of the first and second battery strings 130, 180. By varying the output voltage of the rectifier 120, the controller 150 may control the output current of the rectifier 120 and, indirectly, the discharge current of the first and second battery strings 130, 180. The rectifier 120 may thus supply a varying amount of current to the load 190, allowing the first and second battery strings 130, 180 to, together, maintain a substantially constant discharge current. In addition, the controller 150 can also adjust the rectifier 120 voltage to charge the first and second battery strings 130, 180 simultaneously. As discussed above, the simultaneous charging of the first and second battery strings 130, 180 may prevent either one from being charged to its full potential.

When assessing battery capacity, the controller 150 maintains the discharge current of the first and second battery strings 130, 180 at a substantially constant level for a predetermined assessment interval. The predetermined assessment interval may span, for example, 20 minutes. At the end of the predetermined assessment interval, the voltage sensor 160 measures the voltage of the first and second battery strings 130, 180. The capacities of the first and second battery strings 130, 180 may then be determined with reference to a capacity graph or a battery capacity algorithm.

The predetermined assessment interval is preferably selected such that, with the discharge current of the first and second battery strings 130, 180 at a single substantially constant level, the charges of the first and second battery strings 130, 180 will decrease by a single predetermined discharge amount during the predetermined assessment interval. The predetermined assessment interval and the level of the discharge current of the first and second battery strings 130, 180 may be correlated such that the predetermined discharge amount is about 20% of a full charge levels of the first and second battery strings 130, 180. The first and second battery strings 130, 180 may thus retain an adequate amount of energy for powering the load 190 in the event that an AC power outage occurs during or after the discharge test, but before the first and second batteries 130, 180 have been fully recharged.

As discussed above, because the prior art battery plant 100 treats both the first and second battery strings 130, 180 as identical, a predetermined discharge amount of 20% may not be adequate or beneficial therefor. As a result, one of the first and second battery strings 130, 180 may not maintain an adequate amount of energy for powering the load 190 if such a power outage does occur.

Figure 2:
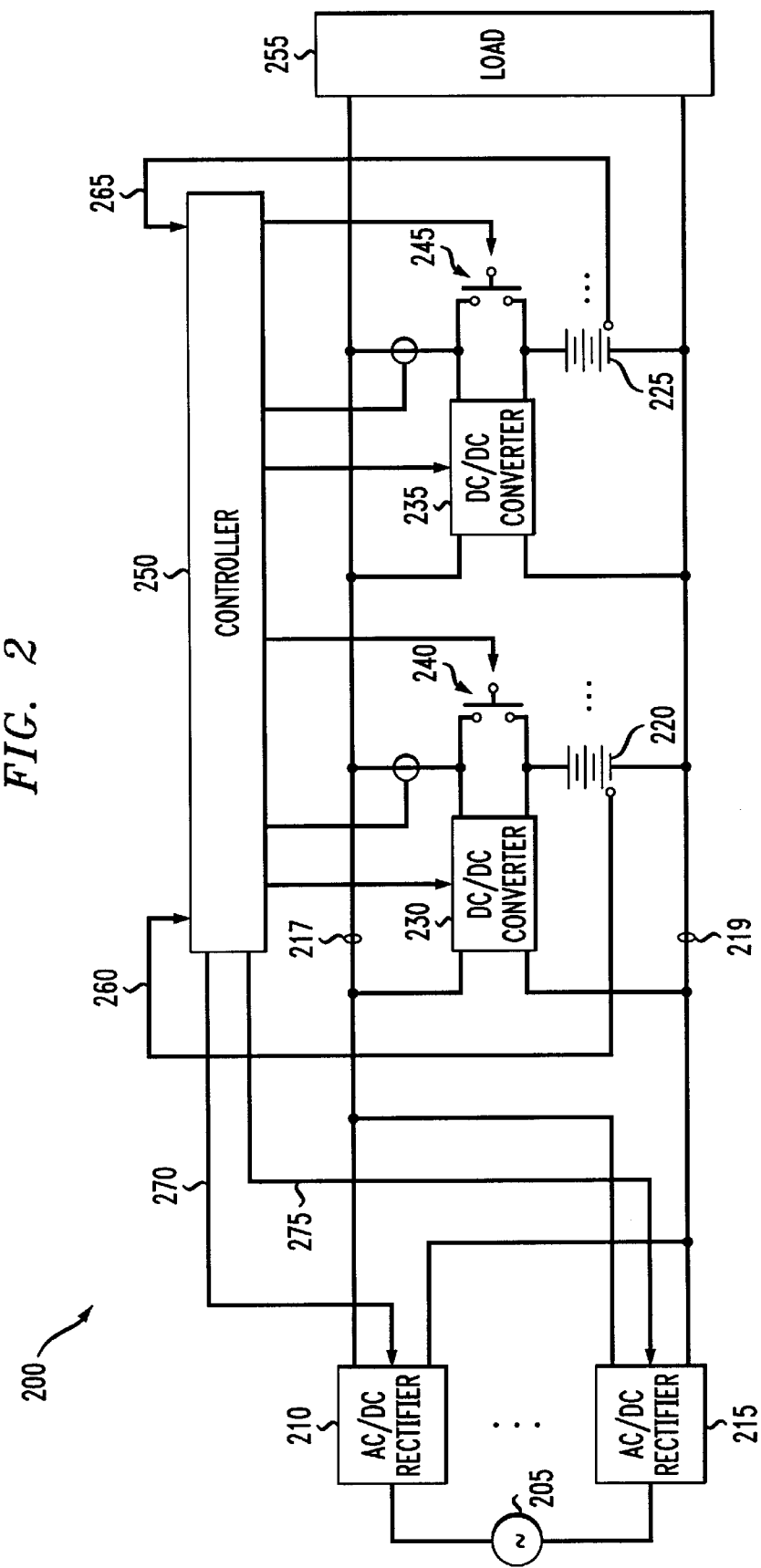
FIG. 2 illustrates a diagram of an embodiment of a battery plant employing a battery management system constructed according to the principles of the present invention.

Referring now to FIG. 2, illustrated is a diagram of an embodiment of a battery plant 200 employing a battery management system constructed according to the principles of the present invention. The battery plant 200 is coupled to a source of AC power 205 and provides DC power to load a 255. As with the battery plant 100 in FIG. 1, the battery plant 200 is employable to power variable loads (i.e., loads having variable current draw) such as wireless base station equipment. The current draw of the load 255 may also vary, for example, as a function of an amount of voice traffic carried by the base station.

The battery plant 200 includes first and second rectifiers 210, 215 coupled to the source 205. Those skilled in the pertinent art realize, of course, that the battery plant 200 may include any number of parallel-coupled rectifiers, depending on the power requirements of the load 255. The outputs of the first and second rectifiers 210, 215 are coupled to a pair of rails (first and second rails 217, 219), which form a power bus of the battery plant 200. The battery plant 200 further includes first and second battery strings 220, 225 across the pair of rails 217, 219. Of course, additional battery strings may be added as necessary to increase the availability of the battery plant 200. The first and second battery strings 220, 225 may include VRLA batteries or any other type of battery, whether conventional or later-developed.

The battery plant 200 further includes a controller 250, controlling the operation of the battery plant 200. The controller 250 may be a single controller or, alternatively, may include a main controller that communicates with a number of sub-controllers to control the operation of the battery plant 200. The controller 250 can charge the first and second battery strings 220, 225 all together or individually, conduct individual capacity assessments on the first and second battery strings 220, 225, or simply operate the battery plant 200 in a normal manner (i.e., operate the battery plant in a conventional manner).

The battery management system includes first and second DC/DC converters 230, 235 having first and second outputs series-coupled with the first and second battery strings 220, 225, respectively. The inputs of the first and second DC/DC converters 230, 235 are coupled across the pair of rails 217, 219 of the power bus. The first and second DC/DC converters 230, 235 may be any type of bi-directional converter.

The battery management system further includes first and second switching circuits 240, 245 coupled across the first and second DC/DC converters 230, 235, respectively, and also coupled in series with respective first and second battery strings 220, 225.

The battery management system further includes first and second sensors 260, 265, respectively coupled to the first and second battery strings 220, 225, that measure the individual characteristics of the first and second battery strings 220, 225 and provide this information to the controller 250. Contrary to battery plants found in the prior art, the battery plant 200 preferably uses independent monitoring and separate sensors for each battery string so that the first and second battery strings 220, 225 are not treated as identical in temperature, voltage storage, voltage drop, and overall capacity. Those skilled in the art understand that this is important because the first and second battery strings 220, 225 are rarely, if ever, identical to one another. Thus, by not treating the first and second battery strings 220, 225 as identical, the full potential of the first and second battery strings 220, 225 may be realized by the battery plant 200. The battery management system still further is adapted to employ first and second rectifier control signals 270, 275 from the controller 250 to control the first and second rectifiers 210, 215, respectively. The controller 250 uses the first and second rectifier control signals 270, 275 to vary the outputs of the respective first and second rectifiers 210, 215, depending upon whether the battery plant 200 is individually charging the first and second battery strings 220, 225, assessing the individual capacities of the first and second battery strings 220, 225, or simply operating normally.

When charging the first and second battery strings 220, 225, the battery management system operates as follows. Once some or all of the first and second battery strings 220, 225 have been used to power the load 255, or have otherwise lost a portion of its charge, the battery management system optimizes the charging of the first and second battery strings 220, 225 by providing individual battery charging control. First, the controller 250 closes the first and second switching circuits 240, 245 to allow the first and second battery strings 220, 225 to charge at a constant level directly from the rectifiers 210, 215. During this initial charging stage, the first and second sensors 260, 265 detect "worst case" characteristics from one of the first and second battery strings 220, 225, and the controller 250 reacts by treating the first and second battery strings 220, 225 as having these "worst case" characteristics.

For example, if the current of the first battery string 220 rises to a predetermined value before that of the second battery string 225, which is likely indicative of the first battery string 220 reaching its charge capacity, the first sensor 260 passes this information to the controller 250. The controller 250 then opens the first and second switching circuits 240, 245 to prevent further constant level charging to the first and second battery strings 220, 225 at once. At this point, the first and second battery strings 220, 225 have been charged simultaneously.

Then, to insure optimal charging of the first and second battery strings 220, 225, the controller 250 employs the first and second sensors 260, 265 to sense the individual characteristics of the first and second battery strings 220, 225. These characteristics can include battery temperature, voltage, voltage drop, or any other characteristics advantageous to determining the optimum charge of a battery string. By opening the first or second switching circuits 240, 245, the controller 250 uses the first and second DC/DC converters 230, 235 to individually charge the respective first and second battery strings 220, 225. The controller 250 regulates the outputs of the first and second DC/DC converters 230, 235 based on characteristics detected therefrom in association with the respective first and second battery strings 220, 225. By regulating a single converter for each battery string, the controller 250 insures that each battery string obtains its optimum level of charge so as to guarantee peak performance from the first and second battery strings 220, 225, especially, in the event of a power outage of the battery plant 200. The first and second DC/DC converters 230, 235 may thus supply varying outputs to the respective first and second battery strings 220, 225 while the first and second rectifiers 210, 215 maintain a constant amount of current to the load 255.

In addition, the controller 250 may open all but one of the first and second battery strings 220, 225 during this charging interval. By maintaining at least one of the first and second battery strings 220, 225 directly coupled to the first and second rectifiers 210, 215 and the load 255, the controller 250 can insure that the load 255 will have a power source in the event of a power outage during the charging interval, even while the remaining batteries are receiving individual peak charging through the converters. Alternatively, when more than one battery string is used in the battery plant 200, the controller 250 may maintain a direct connection to that battery string receiving an optimum charge, while maintaining a connection through the respective ones of the first and second DC/DC converters 230, 235 between the remaining battery strings, the first and second rectifiers 210, 215, and the load 255. By optimally charging one battery string at a time in this manner, the controller 250 further insures that the load 255 will have a sufficient power source in the event of a power outage.

In addition to individual battery string charging, the battery management system disclosed by the present invention also allows the charge capacity of each of the first and second battery strings 220, 225 to be assessed. Assessing the charge capacity of each of the first and second battery strings 220, 225 ensures that each battery string has not fallen below a minimum threshold (such as 80% of rated capacity) and requires maintenance or replacement. When testing the capacity of the first and second battery strings 220, 225, the battery management system operates as follows. During a capacity assessment function, the controller 250 uses the first and second rectifier control signals 270, 275 to control the output voltage of the first and second rectifiers 210, 215, respectively, to discharge designated battery strings at a substantially constant current level. The controller 250 designates which battery string's capacity will be assessed by closing the switch located proximate a respective battery string. By closing the switch, the battery string to be assessed is directly coupled to the first and second rectifiers 210, 215. In the illustrated embodiment, the controller 250 controls the output voltage of the first and second rectifiers 210, 215 by adjusting their output voltage relative to the individual characteristics of the one of the first and second battery strings 220, 225 designated for capacity assessment. These individual characteristics are detected by and transmitted through the first and second sensors 260, 265 to the controller 250.

The capacity of each of the first and second battery strings 220, 225 and their individual charge levels still determine the duration for which each of the first and second battery strings 220, 225 can provide energy. However, as the first and second battery strings 220, 225 age, their individual capacities will unevenly decrease, reducing the duration for which each of the first and second battery strings 220, 225 can provide energy, even when fully charged. The system, therefore, detects when the actual respective capacities of the first and second battery strings 220, 225 has diminished beyond the above-mentioned threshold of 80% (or any other threshold) of their rated capacity. Thus, the first and second battery strings 220, 225 may be considered to have failed, and thus replaced, individually to maintain the battery plant 200 at an optimum level of availability.

Because the first and second battery strings 220, 225 are not treated identically, the battery plant 200 will indicate the failure of only that battery string which has actually failed and requires replacement, rather than indicating failure of both of the first and second battery strings 220, 225 (when only one has actually failed). As a result, the full potential and useful life of the first and second battery strings 220, 225 may be achieved.

Finally, the battery plant 200 can also operate normally, similar to conventional battery plants. Since the first and second switching circuits 240, 245 are coupled across the respective first and second DC/DC converters 230, 235 and in series with the respective first and second battery strings 220,225, the controller 250 can activate one or both of the first and second switching circuits 240, 245 in the event of a loss of the power source 205. By closing the first and second switching circuits 240, 245, the controller 250 closes the circuit between the first and second battery strings 220, 225 and the load 255, allowing the load 255 to be driven by the electrical current of the first and second battery strings 220, 225. Once the power source 205 has been restored, the controller 250 can deactivate the first and second switching circuits 240,245, thus opening the circuit between the first and second battery strings 220, 225 and the load 255, thus bypassing the first and second battery strings 220,225. Bypassing the first and second battery strings 220,225 allows the load 255 to once again be driven by the power source 205 via the first and second rectifiers 210, 215. Then, the controller 250 can regulate the outputs of the first and second DC/DC converters 230, 235 to recharge the first and second battery strings 220, 225 to peak capacity individually, based on the respective characteristics of each of the first and second battery strings 220, 225, as discussed above. The bulk of the initial recharge, however, will typically be performed by the rectifiers 210, 215.

Also, the controller 250 can decouple one or more of the battery strings 220, 225 found in the battery plant 220, 225. For example, the controller 250 can deactivate the first switching circuit 240, thus decoupling the first battery string 220 from both the first and second rectifiers 210, 215 and the load 255. In addition, the controller 250 could prevent the first DC/DC converter 230 from transferring any electrical current to the first battery string 220.

Although the present invention has been described in detail, those skilled in the art should understand that they can make various changes, substitutions and alterations herein without departing from the spirit and scope of the invention in its broadest form.

What is claimed is:

1. For use with a battery plant coupled to a source of electrical power and having a power bus coupled to a load, said battery plant including a battery string coupled across a pair of rails of said power bus, a battery management system, comprising:

a DC/DC converter, couplable in series with said battery string, adapted to condition a voltage provided to said battery string as a function of a characteristic of said battery string; and a switching circuit, coupled across said DC/DC converter, adapted to selectively allow said DC/DC converter to be bypassed thereby allowing said battery string to power said load.

2. The battery management system as recited in claim 1 wherein said battery plant further comprises at least one AC/DC rectifier coupled to said source of electrical power.

3. The battery management system as recited in claim 1 wherein said DC/DC converter is a bi-directional DC/DC converter.

4. The battery management system as recited in claim 1 wherein said battery plant further comprises a controller that monitors said characteristic of said battery string.

5. The battery management system as recited in claim 1 wherein said battery plant further comprises a plurality of battery strings coupled across said rails of said power bus.

6. The battery management system as recited in claim 5 further comprising a plurality of DC/DC converters and switching circuits, each of said plurality of DC/DC converters and switching circuits being adapted to be coupled to a corresponding one of said plurality of battery strings.

7. The battery management system as recited in claim 1 wherein said battery string comprises at least one battery selected from the group consisting of:
 a valve-regulated lead-acid (VRLA) battery;
 a flooded lead-acid battery;
 a nickel-cadmium battery; and
 a lithium battery.

8. For use with a battery plant coupled to a source of electrical power and having a power bus coupled to a load, said battery plant including a battery string coupled across a pair of rails of said power bus, a method of managing an operation of said battery string, comprising:
 conditioning a voltage provided to said battery string as a function of a characteristic of said battery string with a DC/DC converter series-coupled to said battery string; and
 selectively bypassing said DC/DC converter thereby allowing said battery string to power said load.

9. The method as recited in claim 8 wherein said source of electrical power is an AC source of electrical power, said method further comprising transforming said electrical power to a substantially equivalent DC component.

10. The method as recited in claim 8 wherein said DC/DC converter is a bi-directional DC/DC converter.

11. The method as recited in claim 8 further comprising monitoring said characteristic of said battery string.

12. The method as recited in claim 8 wherein said battery plant further comprises a plurality of battery strings coupled across said rails of said power bus.

13. The method as recited in claim 12 further comprising performing said conditioning and selectively decoupling with respect to said plurality of battery strings.

14. The method as recited in claim 8 wherein said battery string comprises at least one battery selected from the group consisting of:
 a valve-regulated lead-acid (VRLA) battery;
 a flooded lead-acid battery;
 a nickel-cadmium battery; and
 a lithium battery.

15. A battery plant coupled to a source of electrical power and adapted to power a load, comprising:
 a power bus, coupled between said source of electrical power and said load, having a pair of rails;
 a battery string coupled across said pair of rails;
 a battery management system, including:
  a DC/DC converter, series-coupled to said battery string, adapted to condition a voltage provided to said battery string as a function of a characteristic of said battery string; and
  a switching circuit, coupled across said DC/DC converter, adapted to selectively allow said DC/DC converter to be bypassed thereby allowing said battery string to power said load; and
 a controller, coupled to said battery management system, that monitors said characteristic of said battery string and regulates said battery management system.

16. The battery plant as recited in claim 15 wherein said battery plant further comprises at least one AC/DC rectifier coupled to said source of electrical power.

17. The battery plant as recited in claim 15 wherein said DC/DC converter is a bi-directional DC/DC converter.

18. The battery plant as recited in claim 15 wherein said battery plant further comprises a plurality of battery strings coupled across said rails of said power bus.

19. The battery plant as recited in claim 18 wherein said battery management system further comprises a plurality of DC/DC converters and switching circuits, each of said plurality of DC/DC converters and switching circuits coupled to a corresponding one of said plurality of battery strings.

20. The battery plant as recited in claim 15 wherein said battery string comprises at least one battery selected from the group consisting of:
 a valve-regulated lead-acid (VRLA) battery;
 a flooded lead-acid battery;
 a nickel-cadmium battery; and
 a lithium battery.

* * * * *